United States Patent
Dubé et al.

(10) Patent No.: US 6,630,764 B1
(45) Date of Patent: Oct. 7, 2003

(54) HIGH PERFORMANCE BRUSHLESS MOTOR AND DRIVE FOR AN ELECTRICAL VEHICLE MOTORIZATION

(75) Inventors: Jean-Yves Dubé, 43 rue Fortin, Asbestos, Québec (CA), J1T 4E5; Jérôme Cros, Québec (CA); Philippe Viarouge, Sainte-Foy (CA)

(73) Assignee: Jean-Yves Dube, Quebec (CA)

( * ) Notice: Subject to any disclaimer, the term of this patent is extended or adjusted under 35 U.S.C. 154(b) by 0 days.

(21) Appl. No.: 09/937,936
(22) PCT Filed: Apr. 1, 1999
(86) PCT No.: PCT/CA99/00290
§ 371 (c)(1), (2), (4) Date: Feb. 1, 2002
(87) PCT Pub. No.: WO00/60724
PCT Pub. Date: Oct. 12, 2000
(51) Int. Cl.[7] .............................. H02K 21/22; H02P 6/24
(52) U.S. Cl. ................... 310/177; 310/156.01; 310/184; 310/185; 310/195; 310/67 R; 310/68 R; 310/67 A; 180/65.1
(58) Field of Search ................................. 310/184, 185, 310/68 R, 177, 156, 67 A, 254, 261, 67 R; 180/65.1, 65.2, 65.3–65.8

(56) References Cited

U.S. PATENT DOCUMENTS

| | | | |
|---|---|---|---|
| 3,783,359 A | 1/1974 | Malkiel | |
| 4,719,378 A | * 1/1988 | Katsuma et al. | 310/67 R |
| 5,006,745 A | 4/1991 | Nishio et al. | |
| 5,164,622 A | 11/1992 | Kordik | |
| 5,675,196 A | 10/1997 | Huang et al. | |
| 5,723,931 A | * 3/1998 | Andrey | 310/179 |
| 6,166,475 A | * 12/2000 | Furuki | 310/261 |
| 6,335,582 B1 | * 1/2002 | Abukawa et al. | 310/214 |

FOREIGN PATENT DOCUMENTS

| | | |
|---|---|---|
| EP | 0 521 709 A2 | 7/1993 |
| EP | 0 521 709 A3 | 7/1993 |
| GB | 2 289 991 A | 6/1995 |
| JP | 01008897 A | 12/1989 |
| JP | 4004703 A | 9/1992 |
| JP | 10-285891 | * 10/1998 ........ H02K/21/22 |

* cited by examiner

Primary Examiner—Burton S. Mullins
(74) Attorney, Agent, or Firm—Carter Schnedler & Monteith

(57) ABSTRACT

The system includes a permanent magnet three-phase motor and an electronic current controlled inverter by pulse width modulation. The motor has twenty-two poles and twenty-four slots, three phases and a cylindrical outer rotor. This structure minimizes torque ripple and maximizes energy efficiently. All coil windings are wound around the stator teeth. Several winding configurations are proposed and a special one with only one coil per slot. The motor phases are supplied by alternating rectangular current waveforms. A specific inverter control system is described to maximize efficiency and reduce current ripple and electromagnetic interference under motorizing or generating operations. The current control is realized by using the mosfets voltage for the current measurement.

14 Claims, 10 Drawing Sheets

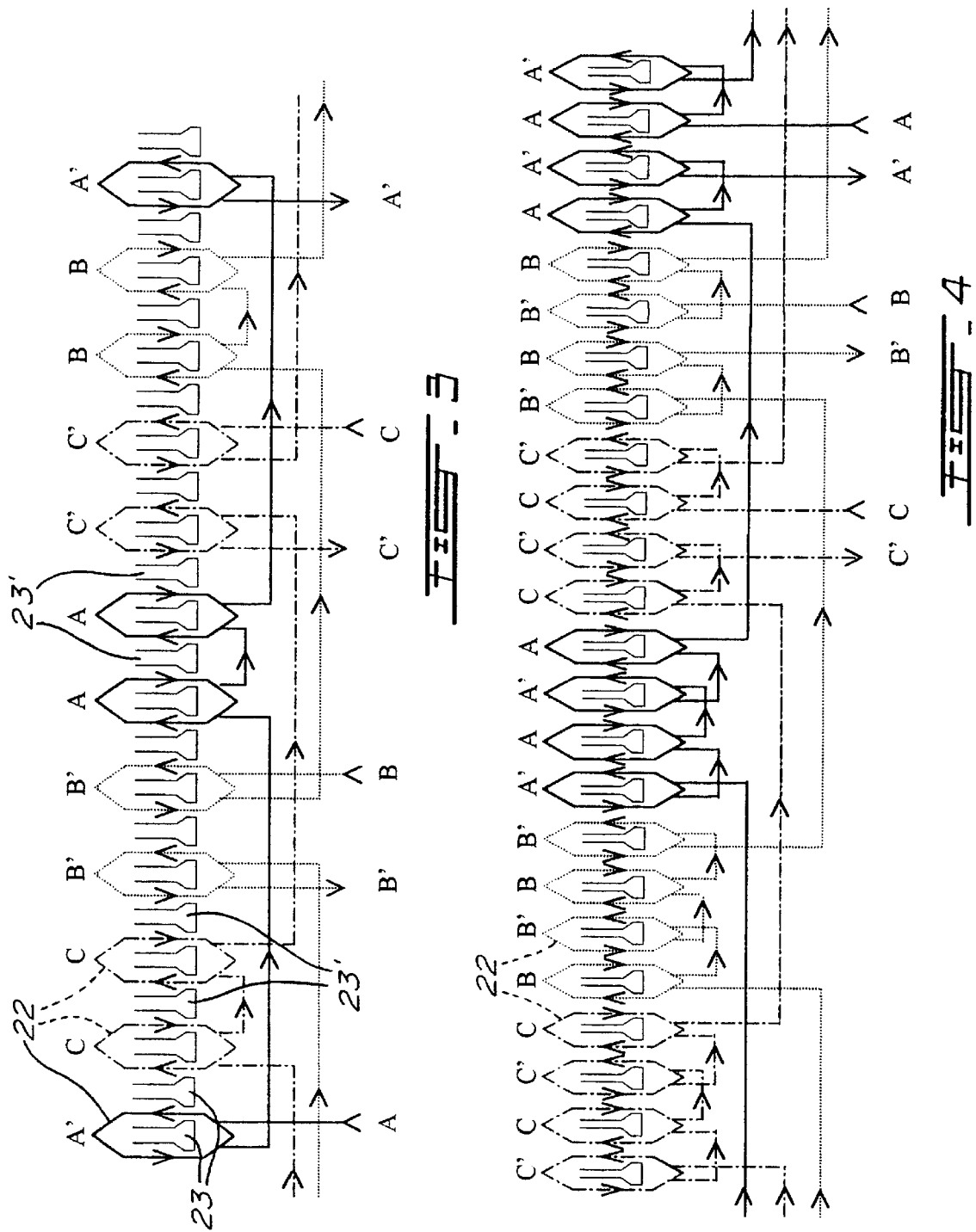

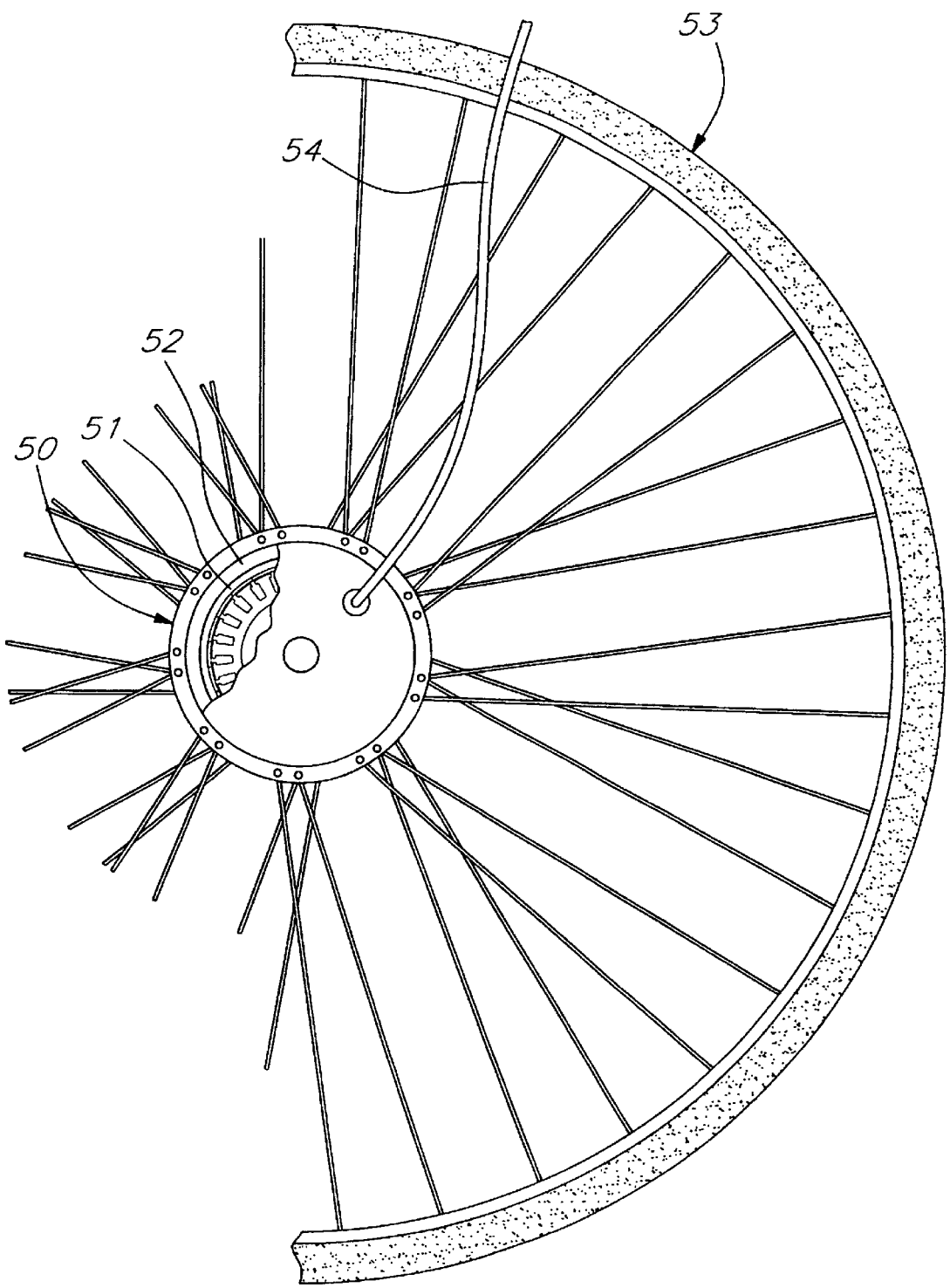

HIGH PERFORMANCE BRUSHLESS MOTOR AND DRIVE FOR AN ELECTRICAL VEHICLE MOTORIZATION

BACKGROUND OF THE INVENTION

The present invention relates to a low cost electric system composed of a new DC brushless permanent magnet motor and its electronic drive which provides high efficiency operation and low torque ripple for the motorization of electric vehicles like, bicycles, rolling chairs, scooters, tricycles, golf cars, trolleys and small utility vehicles.

The motor and its electronic system are supplied by one or several batteries. The vehicle wheel drive can be direct to maximize efficiency or equipped with a speed reducer to minimize the motor size. The proposed solution uses a permanent magnet three-phase motor which can reach four times the nominal torque. This motor structure includes an outer rotor which can be fitted into a vehicle wheel. It can be used as motor or generator with energy recuperation in the battery during braking periods or to create electricity to recharge battery, or power other devices by changing the motor. This motor structure is supplied by a PWM (Pulse Width Modulation) current controlled inverter. The operator can impose the machine torque level in motor or generator operation by setting a current reference. The shape of the alternative phase current waveform is rectangular with a width of 120 electrical degrees. This kind of motor supply is the simplest to realize and it reduces the cost of the control system and the number of sensors.

The brushless motor includes a cylindrical outer rotor wherein permanent magnets are mounted on the surface and an internal stator with coils of insulated wire wound around the teeth. There are twenty two magnet poles on the rotor alternatively magnetized north and south and twenty-four slots on the stator. This combination of slots and poles for a three-phase motor structure allows the realization of a special concentrated winding around the teeth with only one coil per slot. In this case, there are only twelve coils to realize. The winding coefficient and the copper filling factor are higher than in the other known solutions described by Konecny U.S. Pat. No. 4,774,428, Huang and al. U.S. Pat. No. 5,675,196 and Katsuma and al. U.S. Pat. No. 4,719,378 which are using winding with two coils per slot.

This kind of winding with one coil per slot simplifies the assembling of the rotor position sensors (i.e. Hall detectors) near the air gap. The Hall detectors are fixed on the side of several teeth which have no winding and they are using the leakage flux of the permanent magnets to detect the rotor position.

The proposed structure maximizes the energy efficiency and the motor starting torque per unit volume of winding. The advantages of a concentrated winding around the teeth in comparison with a classical distributed winding are described in Konecny U.S. Pat. No. 4,774,428 and Permanent magnet Brushless DC motor with soft metal powder for automotive application—J. Cros, P. Viarouge IEEE Industry applications Society—St-Louis, October 1998. [1]. The volume of copper is reduced and subsequently the Joule losses are minimized.

The amount of vibrations and the cogging torque ripple are reduced drastically like in the other structure combinations described by Konecny U.S. Pat. No. 4,774,428, Huang and al. U.S. Pat. No. 5,675,196 and Katsuma and al. U.S. Pat. No. 4,719,378. The least common multiple (LCM) of the motor's poles and slots describes how many peaks of cogging torque will be present over a single revolution of the motor. In this case, there are 264 torque pulses per revolution and consequently, the cogging torque amplitude is very low (less than 3% of the rated torque).

The proposed motor structure also minimizes the net radial force like another structure described by Huang and al. U.S. Pat. No. 5,675,196.

The electronic supply includes a power electronics system and a control electronics system. Both systems can be inserted inside the motor housing, in the center of the stator yoke. The power electronics system is composed of an inverter with six Mosfets or multiple Mosfets which operate like six Mosfets. The structure diodes of the mosfets are used to ensure the current reversibility. At each sequence of conduction defined by the rotor position detector, two transistors are switched on to supply two motor phases. In the classical mode of operation, a modulation signal is applied on the gate of these two systems. Both systems can be inserted inside the motor housing, in the center of the stator yoke. The power electronics system is composed of an inverter with six Mosfets or multiple Mosfets which operate like six Mosfets. The structure diodes of the mosfets are used to ensure the current reversibility. At each sequence of conduction defined by the rotor position detector, two transistors are switched on to supply two motor phases. In the classical mode of operation, a modulation signal is applied on the gate of these two transistors. This method simplifies the control realization and only one current sensor can be inserted in the DC bus for the current measurement.

Another solution consists in applying the modulation signal on one transistor only at each sequence of operation: this method is a single switch modulation technique. The other transistor is switched "on" during all the duration of this sequence of conduction. An example of the single switch modulation is described in an article titled E.M.I. tests on a brushless actuator is described in Comparison of M. Lajoie-Mazene, J. P. Berry—European Power Electronics—Brighton (U. K.), September 1993 (EMI Tests), in the case of motoring operation only, compared to the classical mode of operation where the modulation signal is applied on the gate of the two transistors. It is shown that the single switch modulation provides lower electromagnetic interferences (EMI and reduces the commutation losses, the conduction losses in low voltage applications, the current ripple and the size of the input filtering capacitor. The proposed electronic system is using the single switch modulation and it can be used for motor as well as generator operation. Consequently, the current regulation is realized without any external current sensor.

SUMMARY OF THE INVENTION

It is a feature of the present invention to provide a high performance brushless DC permanent magnet motor and a pulse width modulation electronic inverter for the motorization of electric vehicles supplied with electrical batteries. The motor structure includes an outer rotor which can be fitted to a vehicle wheel. It can be used as a motor or as a generator with recuperation of kinetic energy in the batteries during braking periods.

Another feature of the invention is to provide a special design and the design of its three-phase winding maximize the energy efficiency and the motor starting torque per unit volume of winding. A concentrated winding is wound around the teeth with only one coil per slot. This solution simplifies the winding realization and maximizes the winding coefficient and the copper filling factor.

Another feature of the invention is that the assembling of the rotor position sensor (i.e. Hall detectors) near the air gap is simplified by the winding configuration. The Hall detectors are fixed on the side of several teeth which have no winding and they are using the leakage flux of the permanent magnets to detect the rotor position. The amount of vibrations, the cogging torque ripple and the radial force are greatly reduced.

Another feature of the invention is to provide specific inverter control system which reduces the commutation losses, the diode conduction losses in low voltage applications, the current ripple, the size of the input filtering capacitor and electromagnetic interference. A specific single switch modulation technique is used: The modulation signal is applied only on one transistor at each sequence of operation defined by the rotor position detector. The other transistor is switched on during all the duration of this sequence of conduction. This single switch modulation method maximizes the efficiency of the electronic supply and the current regulation is realized without any external current sensor.

According to the above features, from a broad aspect, the present invention provides a brushless DC motor for electrical vehicle motorization. The motor comprises a cylindrical rotor with 22 poles constructed with segments of permanent magnet material alternatively magnetized north and south. A stator core of ferromagnetic material is spaced inwardly of the rotor and defines a magnetic clearance gap therebetween. The stator core has twenty four slots and define teeth between the slots. A three-phase winding with coils of insulated wire is wound around the teeth. There is provided one coil per slot with predetermined connection patterns A', C, C, B', B', A, A, C', C', B, B, and A' resulting in reduced torque ripple without any slot or magnet skewing.

According to a still further broad aspect of the present invention there is provided a brushless DC motor as above described but wherein there is further provided two coils per slot having predetermined connection patterns C', C, C', C, B, B', B, B', A', A, A', A, C, C', C, C', B', B, B', B, A, A', A, A'.

According to a still further broad aspect of the present invention there is provided a brushless DC motor electronic pulse with modulation driver and control system. It includes a power electronic three phase inverter having six power of mosfets. A current control system is coupled to the inverter for generating a 120 electrical degrees rectangular phase current pulses. An electronic control system is provided for both motor and a generator operation mode of the motor and uses a single switch modulation technique.

According to a still further broad aspect of the present invention there is provided a brushless DC motor for breaking a wheel of devices on which people are displaced by self-motorization or electric motor motorization. The motor comprises a cylindrical rotor with twenty two poles constructed with segments of permanent magnet material alternatively magnetized north and south, a stator core of ferromagnetic material spaced inwardly of said rotor and defining a magnetic clearance gap, therebetween said stator core having twenty-four slots and defining teeth between said slots, a three phase winding with coils of insulated wire being wound around the teeth. The rotor is connected to a hub of the wheel. Control circuit means is provided to control the torque of the motor and therefore its arresting force.

BRIEF DESCRIPTION OF THE DRAWING

A preferred embodiment of the present invention will now be described with reference to the accompanying drawings in which:

FIG. 3 is a first coil winding diagram arrangement with one coil per slot;

FIG. 4 is a second coil winding arrangement with two coils per slot;

FIG. 8 shows the simplified waveforms of the phase current and phase emf of the;

FIG. 16 is a simplified fragmented side view showing the motor of the present invention coupled to a wheel of a bicycle through its rotor.

DETAILED DESCRIPTION OF THE INVENTION

Figure 1:
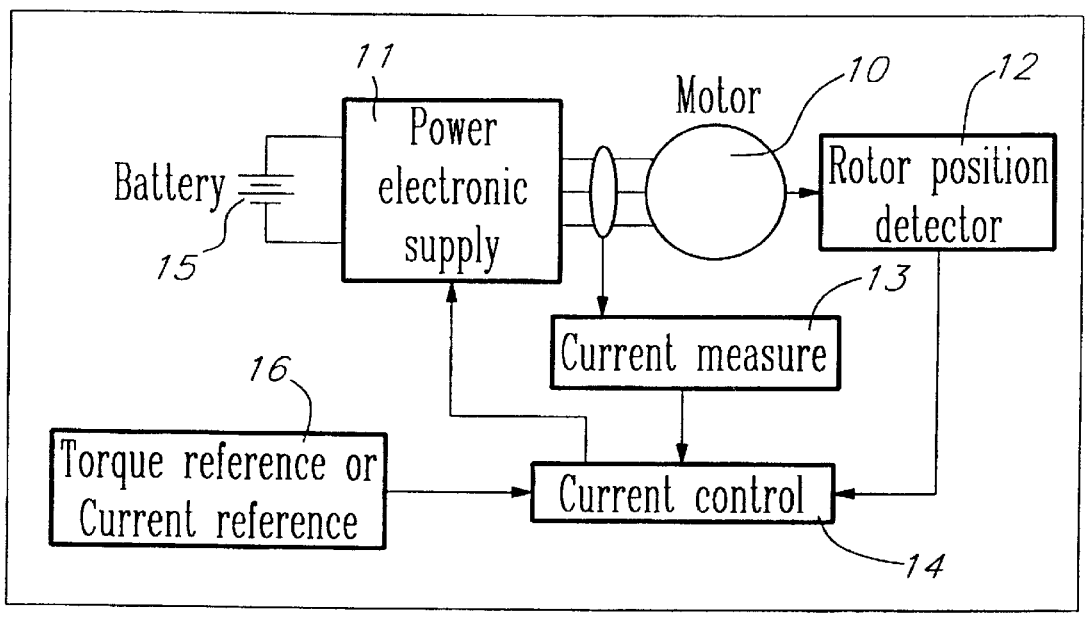
FIG. 1 is a schematic diagram of a brushless DC motor structure including a motor, a power electronics system and a current control system.

In electrical vehicle applications, it is necessary to produce high starting torque and to ensure variable speed in both motor and generator modes of operation. The use of a brushless DC motor is particularly well adapted to this kind of applications. To reduce the cost of the electronic system and the number of sensors, it is better to supply the motor winding phases with a rectangular waveform current. The motor torque is controlled by a simple current regulation and the phase voltage is chopped with a pulse width modulation technique (PWM). The schematic diagram of this kind of brushless DC motor is presented on FIG. 1. It includes a permanent magnet motor 10, a power electronic supply 11, a rotor position detector 12, a current measurement system 13 and a current regulation system which is comprised of a current control circuit 14 fed by the current measuring circuit 13 and a torque reference or current reference circuit 16. The current control circuit 14 is connected to the power electric supply circuit 11 to control the torque of the motor 10. The system can be used for motor or generator operation with energy recuperation on the battery 15 during braking periods.

Figure 2:
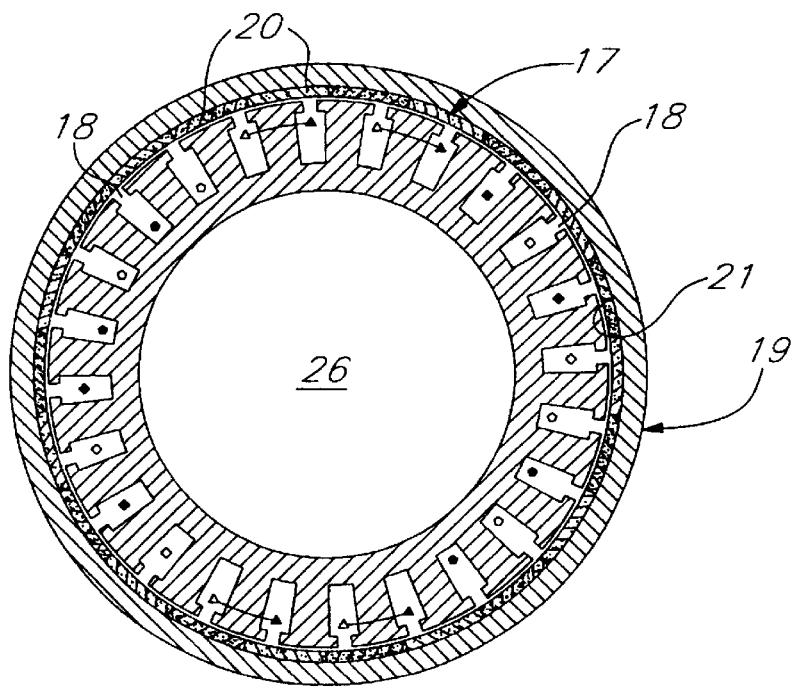
FIG. 2 is a diagrammatic view of the twenty-two pole rotor and the twenty-four slot stator arrangement in accordance with principles of the present invention.

As shown in FIG. 2, the proposed solution in the present invention is to use a motor 10 structure having a twenty-two poles and twenty-four slots 18 with a cylindrical outer rotor 19. Permanent magnets 20 are mounted on the rotor inner surface 21 and altenatively magnetized north and south. The high number of poles reduces the iron volume and provides acceptable iron losses when the speed is less than 1,000 rpm.

As shown in FIGS. 3 and 4, a concentrated winding 22 is wound around the teeth 23. The advantages of a concentrated winding around the teeth in comparison with a classical distributed winding are described in Konecny U.S. Pat. No. 4,774,428 and the EMI Tests article referred to above. The volume of copper is reduced and subsequently the Joule losses are minimized. The energy efficiency and the motor starting torque per unit volume of winding are maximized.

Figure 5:
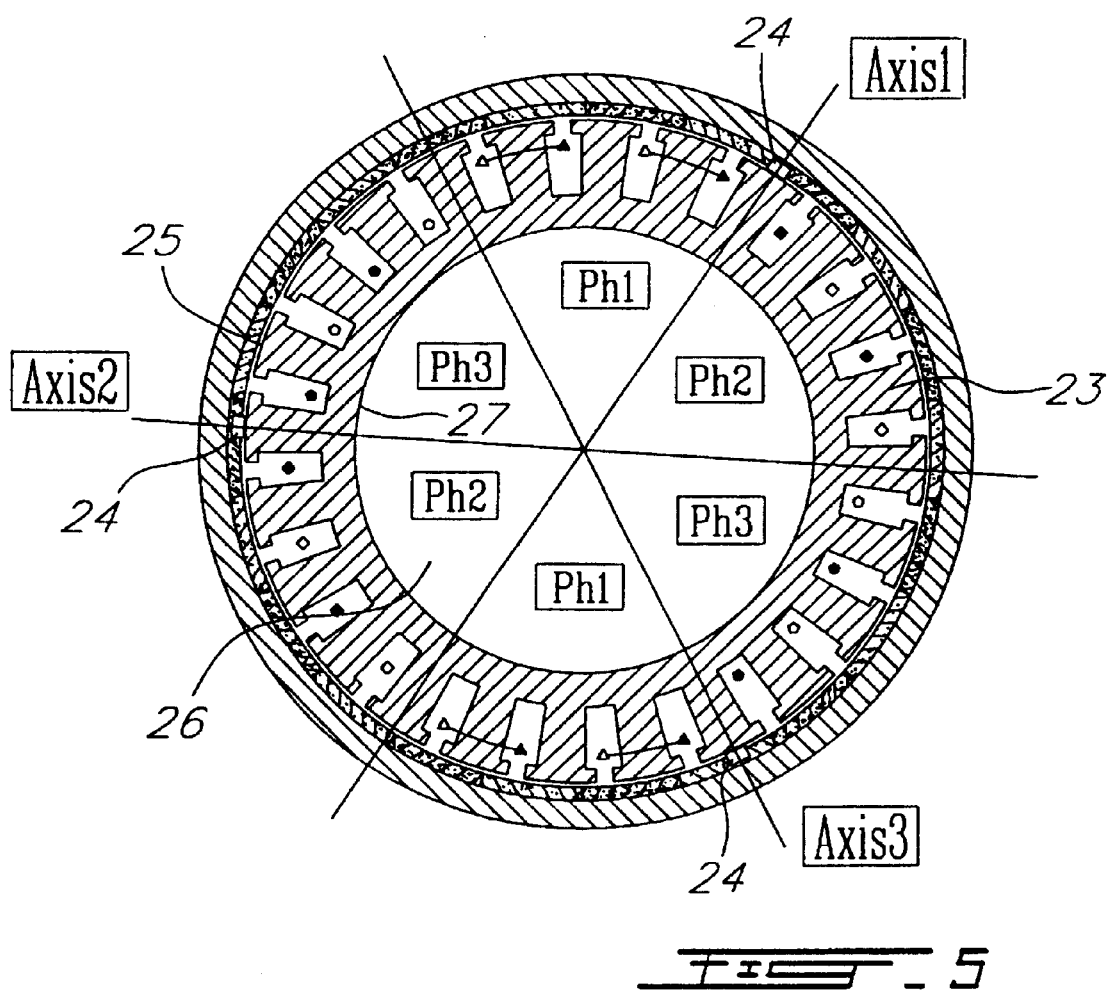
FIG. 5 indicates the position of the three Hall sensors in the motor which are used to detect the rotor position.

A first winding configuration with only one coil per slot, as shown in FIG. 3, maximizes the winding coefficient (0.958) and the slot filling factor and simplifies the winding realization. An alternative winding configuration with two coils per slots is presented on FIG. 4 and it can be used for the proposed motor structure (winding coefficient:0.949). Referring now to FIG. 5, the assembling of the rotor position sensor, i.e. Hall detectors 24, near the air gap 25, is simplified by the winding configuration of FIG. 3, using one coil per slot. The Hall detectors 24 are fixed on the side of several teeth 23 which have no winding, such as teeth 23' in FIG. 3, and they are using the leakage flux of the permanent magnets to detect the rotor position. Hall sensors or detectors 24 are placed to position the phase current and the phase electromagnetic force (back emf) waveforms like in FIGS. 7 & 8. The maximum value of the torque to current ratio is then obtained with this configuration.

The cogging torque ripple are greatly reduced without any slot skewing, as in the other structure combinations described by Konecny U.S. Pat. No. 4,774,428, Huang and al. U.S. Pat. No. 5,675,196 and Katsuma and al. U.S. Pat. No. 4,719,378. The least common multiple (LCM) of the motor's poles and slots describes how many peaks of cogging torque will be present over a single revolution of the motor. In this case, there are 264 torque pulses per revolution and consequently, the cogging torque amplitude is very low (less than 3% of the rated torque). The proposed motor structure also minimizes the net radial force like another structure described by Huang and al. U.S. Pat. No. 5,675,196.

Figure 6:
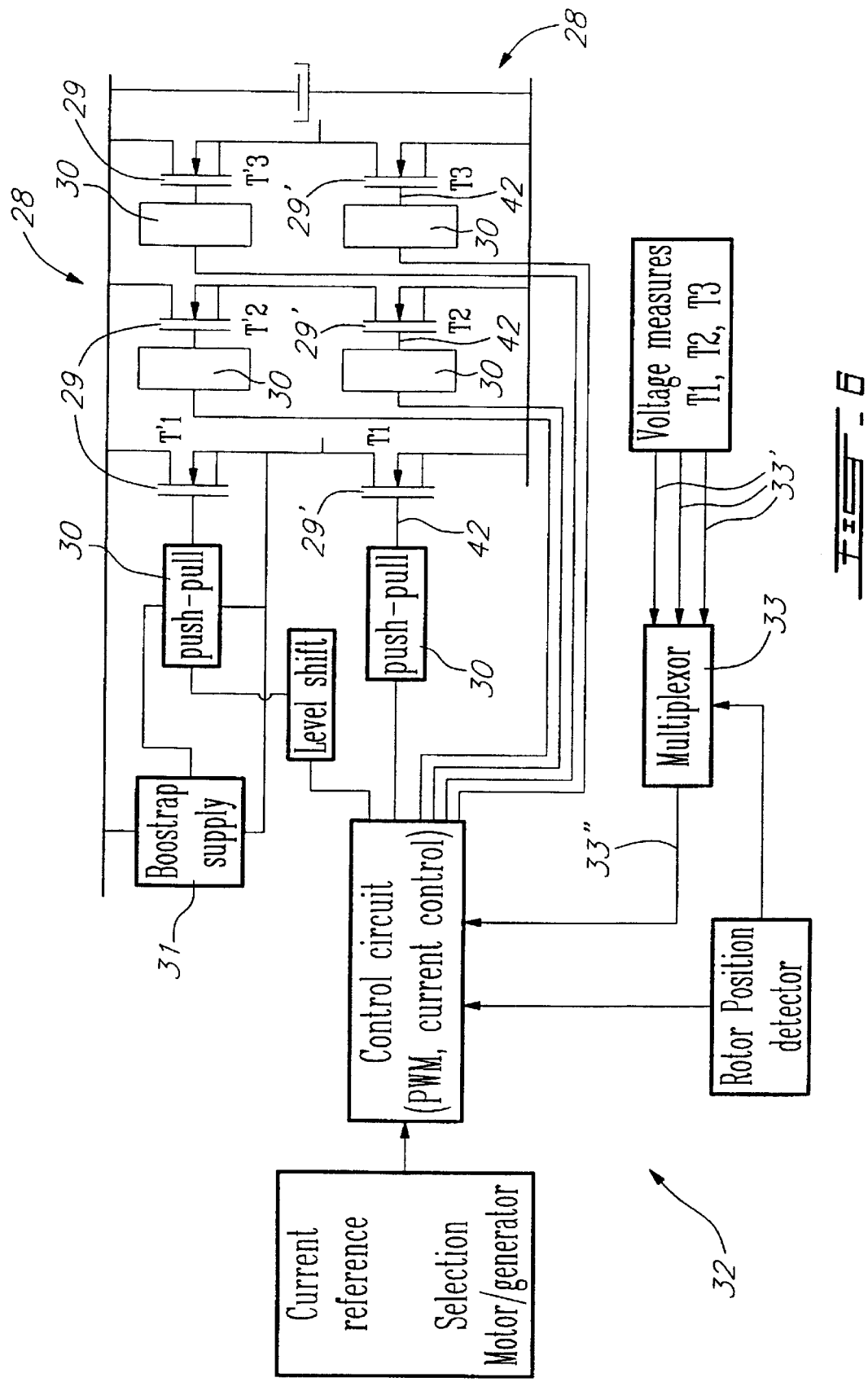
FIG. 6 is a simplified diagram of the electronic system (power electronics system (inverter) and control system)

Referring now to FIG. 6 there is shown the electronic supply which includes a power electronics system and a low power control electronics system. Both systems can be inserted in the cavity 26 inside the motor housing, in the center of the stator yoke 27. The power electronics system is a six switches, PWM (pulse width modulation) inverter 26. Six type N Mosfets 28 (T1, T2, T3, T'1, T'2, T'3) are used and the structure diodes of the mosfets 29 are used to ensure the current reversibility. The electronic system also includes a push-pull driver 30 for each mosfet, three boostrap supplies 31 feed the driver stages of the three transistors T'1, T'2, T'3 of the upper side of the inverter 28 and three level-shift control signals are applied to the driver stages of transistor T'1, T'2, T'3.

A current regulation circuit 32 generates a PWM signal at each transistor control signal. The voltages of the power mosfets 29' T1, T2, T3 on the lower side 28' of the inverter 28 are used to measure the motor currents. The rotor position sensors 24 define the conduction sequence order and are also used to select the voltage of the power mosfet 29 in conduction to be sensed by means of a multiplexer 33 with 3 inputs 33' and 1 output 33". The multiplexer 33 is used to generate a signal equivalent to the motor current, which can be used in the current regulation loop. The operator can select the operation mode of the system (motor or generator operation mode) and the current reference level to impose the torque of the machine.

Figure 7:
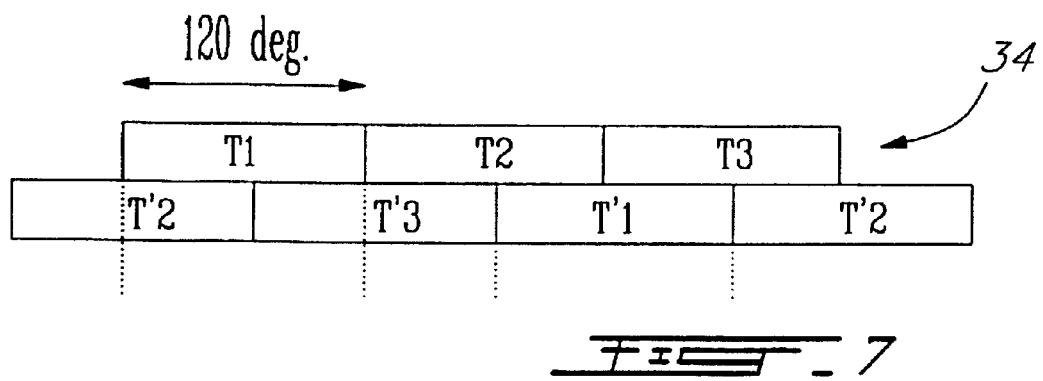
FIG. 7 shows the conduction sequence order of the power mosfets.

FIG. 7 presents the chronogram 37 of the conduction sequences of the power mosfets 29. At each time, there are only two Mosfets switched on. There are six sequences of operation in an electric period. During each sequence two phases of the machine are supplied. There are six current commutations when the rotor rotates with an angle of 32.7 degrees. The commutation process is controlled by the rotor position detectors 24 (i.e. Hall sensors).

Figure 8:
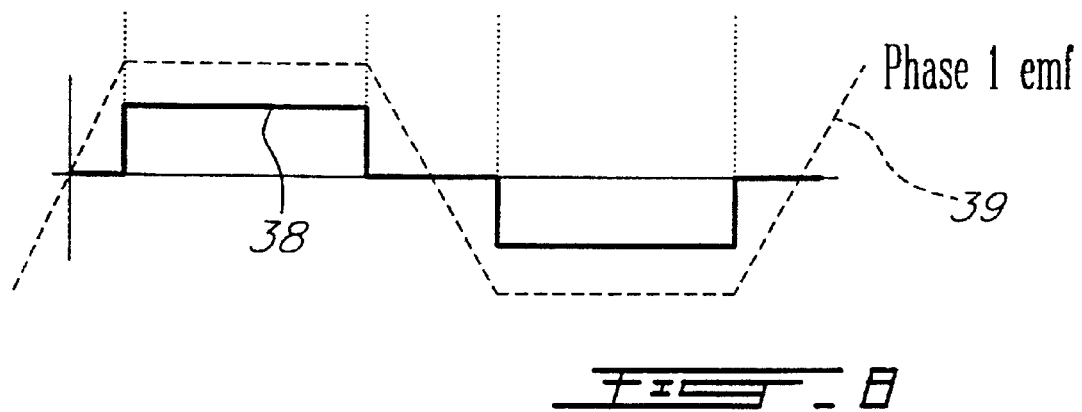

FIG. 8 shows the rectangular waveform 38 of the phase current which is in phase with the waveform 39 of the back electromotive force (back emf) of the same phase.

Referring now to FIGS. 9 to 12., there is shown a single switch modulation technique used for both motor and generator operation. The modulation signal is only applied on the gate of the transistors of the inverter upper side (T'1, T'2, T'3) in the case of motor operation mode (see FIGS. 9 & 10). The transistors T1, T2, T3 remain switched "on" during all the duration of the conduction sequence. In comparison to the classical modulation technique where the modulation signal is applied to switches of both lower and upper sides. This specific single switch modulation technique provides lower commutation losses and lower conduction losses in the case of low voltage applications (the voltage drop of a power mosfet is lower than the voltage drop of a diode) see the E.M.I. tests article referred herein. The efficiency of the inverter 28 is higher. This single switch modulation technique simplifies the measurement of the phase currents and it eliminates the need of an external current sensor. The voltages of the Mosfets (T1, T2, T3) of the inverter lower side 28' can be used to measure the motor phase currents during all the sequences. In the case of the sequence T'1–T2, the voltage of transistor T2 is used to measure the motor phase current.

Figure 9:
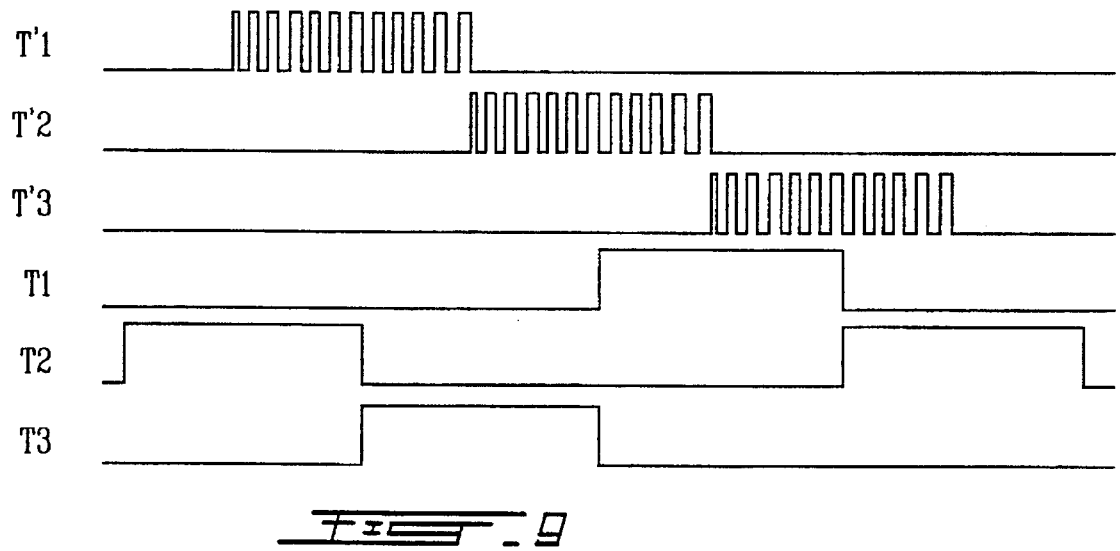
FIG. 9 shows the diagram of the mosfet control signals during one period of the motor operation mode.

FIG. 9 shows the control signals which are applied to the transistor gates in the case of the single switch modulation technique.

Figures 10A, 10B:
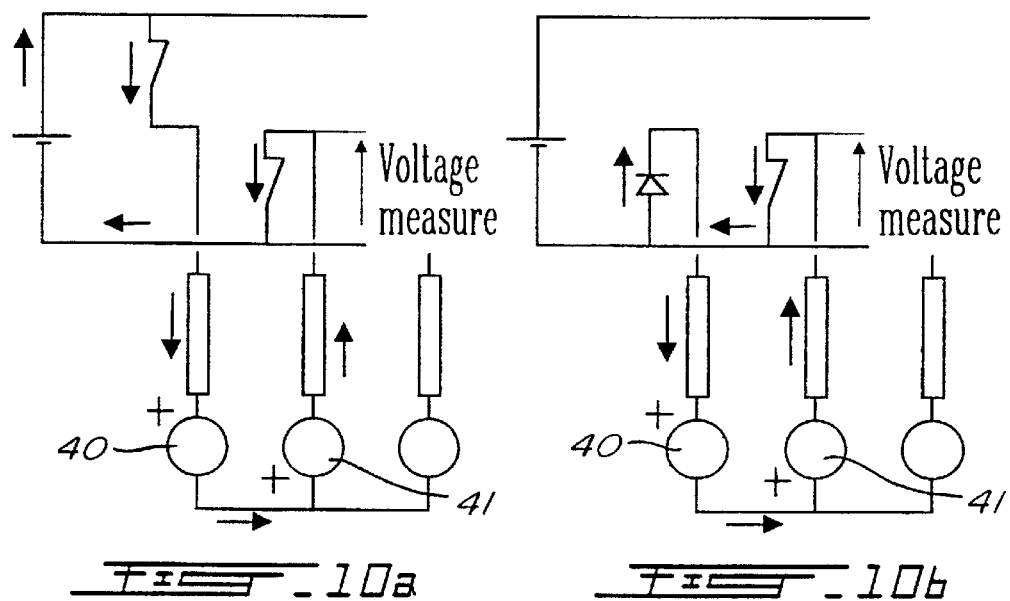
FIG. 10 indicates the current flow in the case of the sequence (T1–T2) in motor operation mode.

FIG. 10 shows the current flow during one sequence in the motor operation mode. When transistors T'1 and T2 are switched "on" (FIG. 10a), the battery supplies two phases 40 and 41 of the motor. When the transistor T'1 is switched "off", the structure diode of mosfet T1 is switched "on" and a free wheeling operation is occurring (FIG. 10b). The current ripple is reduced by half in comparison with the classical two-switch modulation technique. There is no current inversion in the DC bus and so the size of the filtering capacitor (not shown but well known in the art) can be reduced (lower RMS current on the DC bus). Consequently, the electromagnetic interferences are also lower than in the case of the classical modulation mode see the E.M.I. article referred herein.

Figure 11:
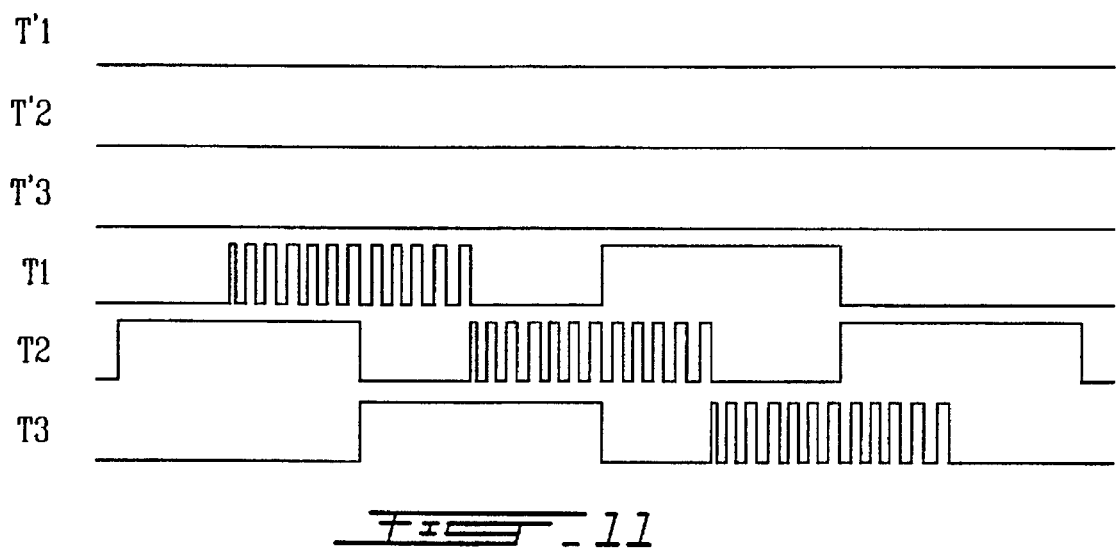
FIG. 11 is a diagram of the mosfet control signals during one period of the generator operation mode.
Figures 12A, 12B:
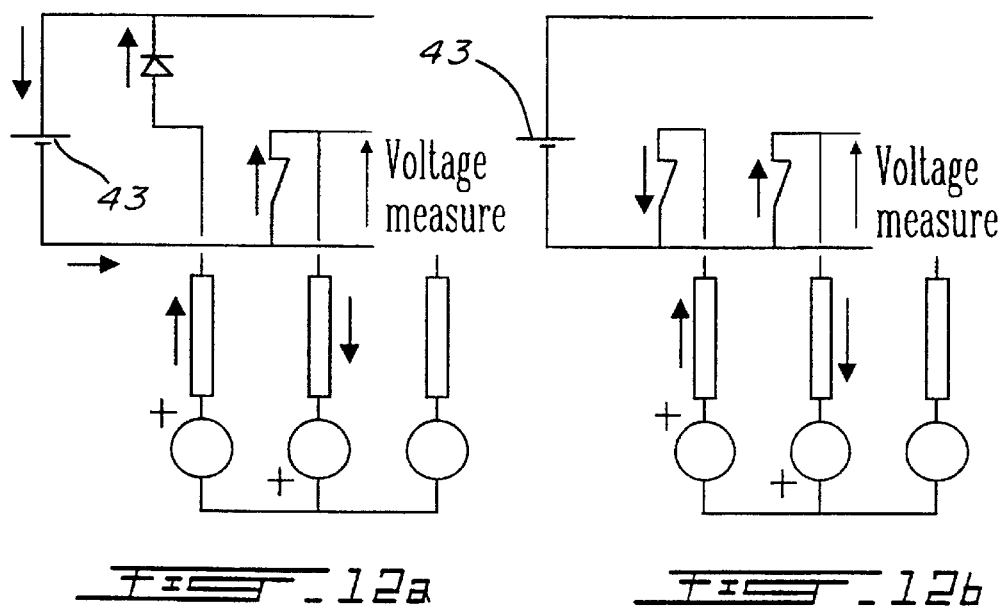
FIG. 12 indicates the current flow in the case of the sequence (T1–T2) in generator operation mode.

FIGS. 11 & 12 present the case of the generator operation mode. The upper side inverter transistors 29 T'1, T'2, T'3 are all switched "off" during the generator operation mode. Only the structure diodes of these transistors are used in this mode. A modulation signal is applied on the gate 42 of transistors T1, T2, T3 (see FIG. 6) in the lower side 28' of the inverter 28. There are some intervals where permanent conduction is occuring. They are used to measure the mosfet voltage for the current control (see FIG. 12). FIG. 12 shows the current flow during one sequence of operation. The machine or motor current increases when the transistors 30 T1, T2 are switched "on" (FIG. 12b). When transistor T1 is switched "off", the structure diode of transistor T1 is switched "on" and the machine supplies the battery 43 (FIG. 12a).

Figure 13:
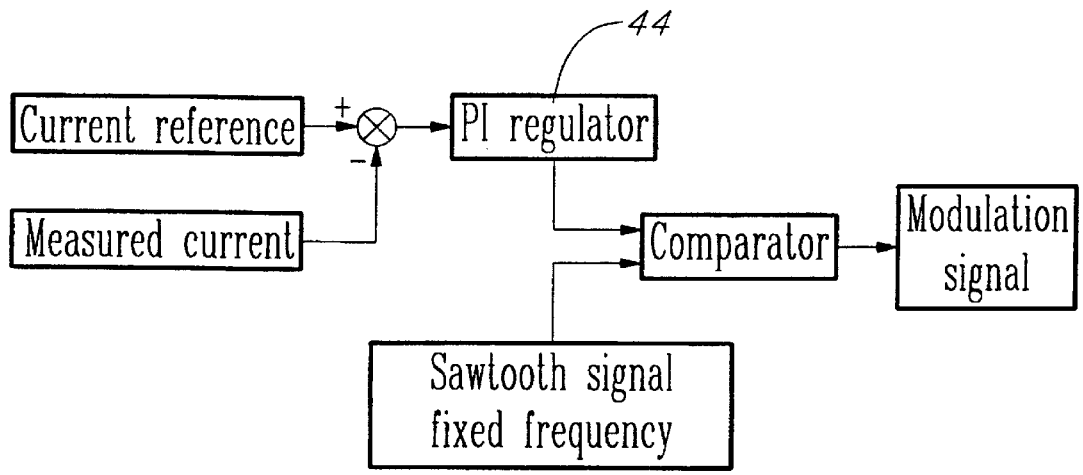
FIG. 13 shows a schematic view of the current control.
Figure 14:
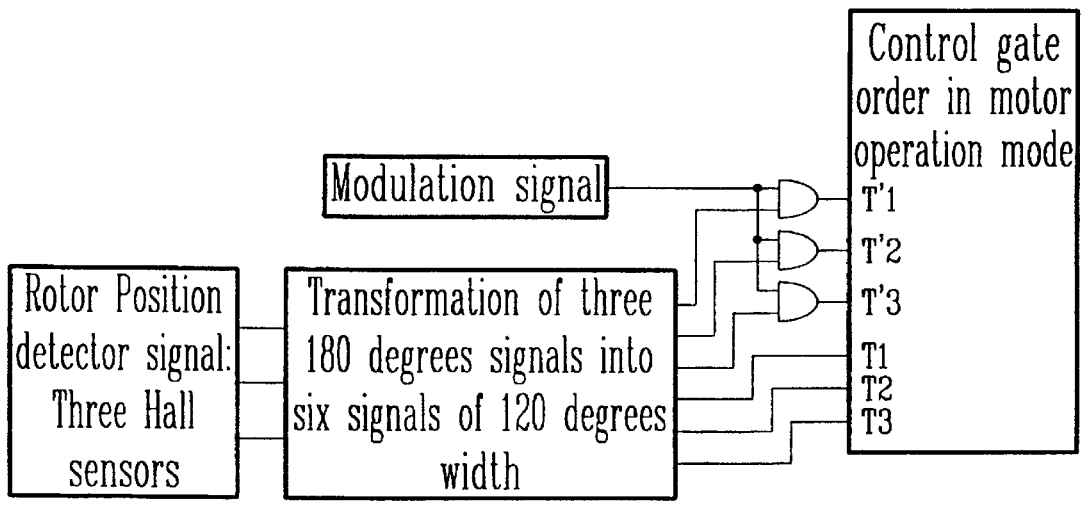
FIG. 14 is a schematic diagram of the transformation of the signals of the rotor position sensors and the generation of the mosfet gate control signals in motor operation mode.
Figure 15:
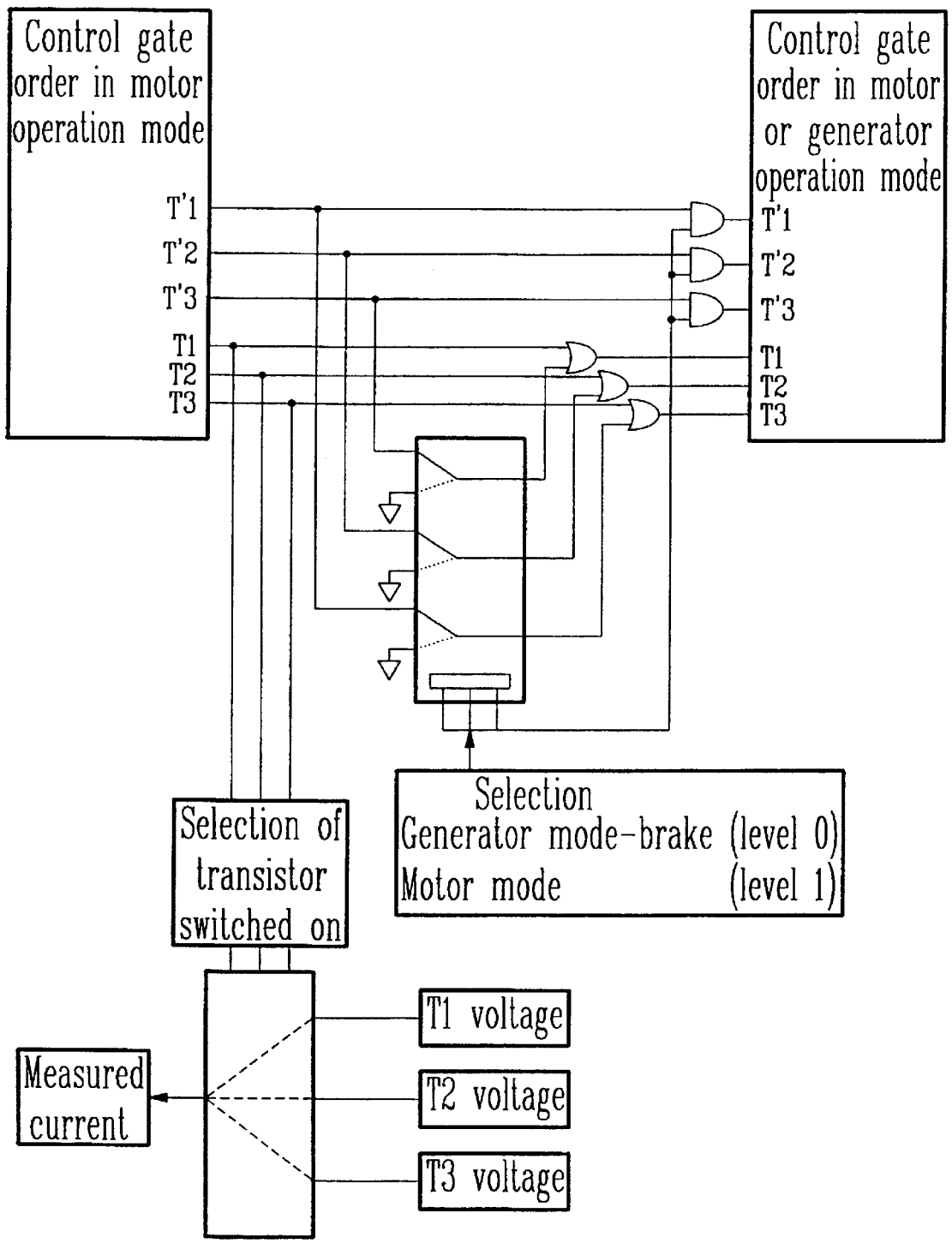
FIG. 15 is a schematic diagram of the electronic system for the generation, the mosfet gate control signals, and the measurement of the phase current in the motor and generator operation mode with the single switch modulation technique.

FIGS. 13 and 14 show block diagram views of a classical current regulation with a PI regulator 44 which can be applied in the case of the single switch modulation mode. The proposed electronic system for both motor and generator operation modes with the single switch modulation technique is presented on FIG. 15. This system includes two signal multiplexers and several AND/OR gates used to control the signals applied to the transistor driver stages and the signals of measurements of the machine current. The system is also realizable by an integrated circuit or a programmable circuit obvious to a person skilled in the art.

It is within the ambit of the present invention to cover any obvious modifications provided such modification fell within the scope of the appended claims.

Referring now to FIG. 16 there is shown a brushless DC motor 50, constructed as above described, and wherein the rotor 51 is connected to a hub 52 of a wheel 53 herein a bicycle wheel. Alternatively, to reduce production cost, the motor cover housing may have connections to which the spokes of the wheel are connected to. A battery, not shown, is conveniently secured to the bicycle and power is fed to the control circuitry provided or mounted within the cavity inside the stator. A cable 54 is secured to a control device which is operated by the user of the bicycle to control the speed of the motor. This control device could be in the form of a rotating handle and grip, a hand lever device or any other convenient means. When the motor is used as a motorizing machine it drives the wheel 53. The motor can also be utilized as a break when placed in its generating mode. As previously mentioned, this motor can be secured to all sorts of electrical vehicles such as wheel chairs, scooters, tricycles, golf trolleys, small utility vehicles, etc.

We claim:

1. A brushless DC motor/generator (10) comprising; a cylindrical outer rotor (19) with twenty two poles (20) constructed with segments of permanent magnet material alternatively magnetized north and south, a stator core (8) of ferromagnetic material spaced inwardly of said rotor and defining a magnetic clearance gap (9) there between, said stator core having twenty-four slots (18) and defining teeth (23) between said slots (18), a three phase winding with coils (7) of insulated wire being wound around the teeth, an electronic supply (11) including a power electronics system and a current control circuit means (14) to control the torque of said motor (10) and therefore its arresting force for braking a wheel (53) of devices on which people are displaced by said DC motor motorizing said wheel, characterized in that there is one coil per slot with predetermined connection patterns: A', C, C, B', B', A, A, C', C', B, B, and A' resulting in reduced torque ripple without any slot or magnet skewing.

2. A brushless DC motor/generator (10) as claimed in claim 1 characterized in that a multiple combination of additions of the number of said twenty-two poles and said twenty-four slots (18), such as forty-four said poles and forty-eight said slots, or sixty-six said poles and seventy-two said slots or ninety-six said poles and eighty-eight said slots; and a wound winding (7) around said teeth (23).

3. A brushless DC motor/generator (10) as claimed in claim 1 characterized in that there are three Hall sensors (24) mounted near said air gap (25) at predetermined positions.

4. A brushless DC motor as claimed in claim 3 having a power electronics pulse width modulation driver and control system, said pulse width modulation driver having a three phase inverter including six power mosfets, a current control system coupled to said inverter for generating 120 electrical degrees rectangular phase current pulses, said control system using a single switch modulation technique.

5. A brushless DC motor/generator (10) as claimed in claim 4 characterized in that said single switch modulation technique is comprised of three of said mosfets (30) being connected at an upper side of said inverter (28) and remain switched "on" by a modulation signal during a motor operation mode of said motor (10), three others of said mosfets (30) being connected as a lower side of said inverter (28) and used to measure motor phase currents during all sequences of the mosfets of said upper side.

6. A brushless DC motor as claimed in claim 5 wherein said mosfets of said upper side of said inverter are switched "off" during a generator operation mode of said DC motor, and wherein a modulation signal is applied on a gate of said three mosfets on said lower side of said inverter.

7. A brushless DC motor/generator (10) comprising; a cylindrical outer rotor (19) with twenty two poles (20) constructed with segments of permanent magnet material alternatively magnetized north and south, a stator core (8) of ferromagnetic material spaced inwardly of said rotor and defining a magnetic clearance gap (9) there between, said stator core having twenty-four slots (18) and defining teeth (23) between said slots (18), a three phase winding with coils (7) of insulated wire being wound around the teeth, an electronic supply (11) including a power electronics system and a current control circuit means (14) to control the torque of said motor (10) and therefore its arresting force for braking a wheel (53) of devices on which people are displaced by said DC motor motorizing said wheel, characterized in that there are two coils (7) per slot (18) with predetermined connection patterns: C', C, C', C, B, B', B, B', A', A, A', A, C, C', C, C', B', B, B', A, A', A, A', resulting in reduced torque ripple without any slot or magnet skewing.

8. A brushless DC motor/generator (10) as claimed in claim 1 characterized in that said motor (10) is also used as a wheel braking device when used in a generator mode.

9. A brushless DC motor/generator (10) as claimed in claim 1 characterized in that said control circuit means (14) comprises: a power electronics three phase inverter (28) provided with six power mosfets (30), a current control system (14) coupled to said inverter (28) for generation of 120 electrical degrees rectangular phase current pulses, an electronic control system (32) for both a motor and a generator operation mode of said motor (10).

10. An electronic control system as claimed in claim 9 wherein voltages across thereof said mosfets on a lower side of said inverter are used to generate a current measurement for the purpose of motor current control of said single switch modulation technique.

11. A brushless DC motor/generator (10) as claimed in claim 7 characterized in that a multiple combination of additions of the number of said twenty-two poles and said twenty-four slots (18), such as forty-four said poles and forty-eight said slots, or sixty-six said poles and seventy-two said slots or ninety-six said poles and eighty-eight said slots; and a winding wound (7) around said teeth 23).

12. A brushless DC motor/generator (10) as claimed in claim 7 characterized in that there are three Hall sensors (24) mounted near said air gap (25) at predetermined positions.

13. A brushless DC motor/generator (10) as claimed in claim 7 characterized in that said motor (10) is also used as a wheel braking device when used in a generator mode.

14. A brushless DC motor/generator (10) as claimed in claim 7 characterized in that said control circuit means (14)

comprises: a power electronics three phase inverter (28) provided with six power mosfets (30), a current control system (14) coupled to said inverter (28) for generation of 120 electrical degrees rectangular phase current pulses, an electronic control system (32) for both a motor and a generator operation mode of said motor (10).

* * * * *

UNITED STATES PATENT AND TRADEMARK OFFICE
CERTIFICATE OF CORRECTION

PATENT NO. : 6,630,764 B1
APPLICATION NO. : 09/937936
DATED : October 7, 2003
INVENTOR(S) : Jean-Yves Dubé, Jérôme Cros and Phillippe Viarouge It is certified that error appears in the above-identified patent and that said Letters Patent is hereby corrected as shown below:

On Drawing Sheet 10/10, Fig. 16 should appear as shown below.

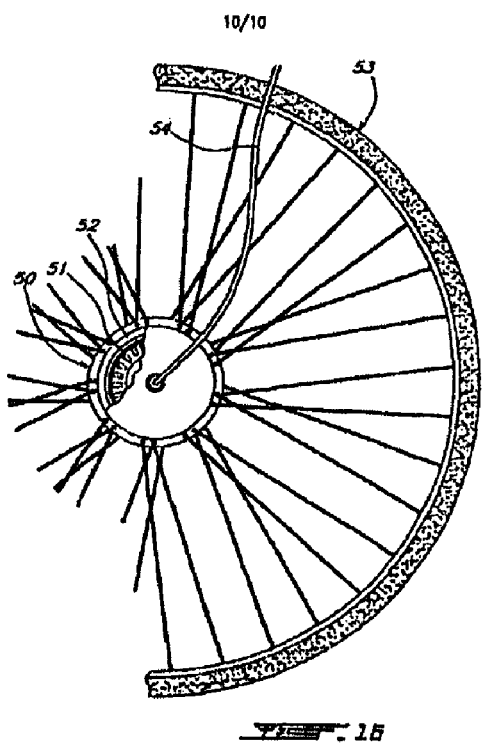

Signed and Sealed this

Ninth Day of March, 2010

David J. Kappos
*Director of the United States Patent and Trademark Office*